United States Patent
Dykstra (10) Patent No.: US 9,646,171 B2
(45) Date of Patent: May 9, 2017

(54) METHOD AND APPARATUS FOR CORRECTLY BINDING FORM OBJECTS TO ENCRYPTED XML DATA

(75) Inventor: Darrell J. Dykstra, Calgary (CA)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 838 days.

(21) Appl. No.: 13/033,965

(22) Filed: Feb. 24, 2011

(65) Prior Publication Data
US 2015/0199537 A1 Jul. 16, 2015

(51) Int. Cl.
*G06F 11/30* (2006.01)
*G06F 21/62* (2013.01)

(52) U.S. Cl.
CPC ................ *G06F 21/6227* (2013.01)

(58) Field of Classification Search
CPC .................................... G06F 21/6227
USPC ........................................ 713/189
See application file for complete search history.

(56) References Cited

U.S. PATENT DOCUMENTS

2005/0268326 A1* 12/2005 Bhargavan et al. ............... 726/1
2007/0014400 A1* 1/2007 Wack et al. ..................... 380/44
2009/0138503 A1* 5/2009 Chowdhury ............... 707/104.1

OTHER PUBLICATIONS

"Getting All XML Elements", www.roseindia.net, Jun. 8, 2007.*
"XML Encryption Syntax and Processing", W3C Recommendation, Dec. 10, 2002.*
"Xforms 1.1", W3C Recommendation, Oct. 20, 2009.*
"XML Encryption Syntax and Processing", W3C Recommendation Dec. 10, 2002, downloaded on Feb. 24, 2011 from http://www.w3.org/TR/xmlenc-core/, 32 Pages.

* cited by examiner

*Primary Examiner* — Michael Y Won
*Assistant Examiner* — Nicholas Celani
(74) *Attorney, Agent, or Firm* — Keller Jolley Preece (57) ABSTRACT

A method and apparatus for correctly binding form objects to encrypted XML data is described. In one embodiment, the method includes examining at least one data description stored in a set of replacement properties for a set of encrypted XML data, wherein each data description is associated with an encrypted data element from the set of encrypted XML data and binding form objects to encrypted data elements of the set of encrypted XML data using the at least one data description.

17 Claims, 5 Drawing Sheets

METHOD AND APPARATUS FOR CORRECTLY BINDING FORM OBJECTS TO ENCRYPTED XML DATA

BACKGROUND

Technical Field

Embodiments generally relate to Extensible Markup Language (XML) applications, and, more particularly, to a method and apparatus for correctly binding form objects to encrypted XML data.

Description of the Related Art

As more information is produced via computers, new forms of encoding this information have been developed. Various encoding methods and formats have arrived that leverage this information in different ways for the benefit of users. One such encoding format is known as Extensible Markup Language (XML). XML provides a set of rules for interpreting data so as to be easily readable by a computer. XML documents typically contain two types of data elements: markup elements and content elements. The markup elements define a structure and a hierarchy for the content elements within the document. The content elements define a raw format for presenting various information within the structure formed by the markup elements.

The information stored in the content elements is not easily readable or editable. As such, one common technique for interacting with the information within an XML document is the use of an XML form. XML forms display data encoded in an XML format in a user interface for the purposes of organizing and interacting with said data. XML forms typically include a set of instructions for binding elements of the form (i.e., form objects) to elements of the XML data. This binding process allows a developer of the XML form to direct which XML data element is specified in each object within the form.

In order to provide enhanced data security to users, XML data may be encrypted. However, when XML data is encrypted, the markup elements used by the XML form to bind to the XML data are encrypted as well. Furthermore, the encryption process uncouples an original set of bindings between the XML data and the XML form. Because the encrypted markup element cannot be correctly matched with a specific form object, the XML form cannot properly bind to the proper elements of the XML data.

Therefore, there is a need in the art for an improved method and apparatus for binding form objects to encrypted XML data.

SUMMARY

Embodiments include a computer implemented method for correctly binding form objects to encrypted XML data, which comprises examining at least one data description stored in a set of replacement properties for a set of encrypted XML data, wherein each data description is associated with an encrypted data element from the set of encrypted XML data. Another embodiment includes binding form objects to encrypted data elements of the set of encrypted XML data using the at least one data description.

While the method and apparatus for binding form objects to encrypted XML data described herein by way of example for several embodiments and illustrative drawings, those skilled in the art will recognize that the method and apparatus for binding form objects to encrypted XML data are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for binding form objects to encrypted XML data as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of the present disclosure provide for a method and apparatus for correctly binding form objects to encrypted Extensible Markup Language (XML) data using data descriptions that are stored (i.e., preserved) in replacement properties. The XML format provides the ability to organize various sets of data into a computer readable format, according to established relationships between different sets of data, such as a hierarchy XML. A set of XML data typically comprises a set of markup elements and a set of content elements. The markup elements define one or more data structures, which are then populated with values from the content elements. For example, the markup elements may define a data structure known as "PersonalInfo." The "PersonalInfo" may have multiple sub-members, such as a Name, Telephone Number, Address, etc. Each of these elements is defined as a sub-member by the markup elements. The corresponding values for each, for example, "John Doe" for Name, "(555) 555-5555" for Telephone Number, "123 Fake Street" for Address, etc., are defined by the content elements within the XML data.

XML forms are used to provide interfaces with XML data. These forms may be stand-alone programs, or they may execute within a separate application such as a web browser or Portable Document Format (PDF) reader. XML forms define interfaces that bind with XML data to allow viewing and manipulation of the XML data. In order to bind with a given set of XML data, objects within the form must be directed to bind with particular data elements contained within the XML data. For example, when using the PersonalInfo structure described above, a "Name" field within an XML form might be instructed to bind with the "Name" element of the first PersonalInfo structure present within the XML data.

XML data structures are used in a variety of applications, many of which involve secure and/or sensitive information. As such, it is common practice to encrypt XML data structures to ensure the data is only accessible to authorized users. The specification for the XML standard includes provisions for such encryption. While the standard includes provisions for encrypting only the content of data elements, enclosing elements of the data structures are typically encrypted in order to encrypt entire blocks of data at once. As such, the markup elements defining the structure of the contents elements are also encrypted. Since the markup elements are no longer present, XML forms can no longer bind properly to the XML data.

Embodiments of the present disclosure solve this problem by preserving correct, original bindings of the markup language within replacement properties (e.g., "EncryptionProperty" attributes) of the encrypted XML data. The replacement properties are generated while the data is being encrypted, and may be populated with various data elements describing how the encryption was performed. Embodiments of the invention comprise extracting the description of data elements within the data during the encryption process, and then storing the data element descriptions in a set of the replacement properties of the encrypted XML data. When the encrypted data is bound to a form, embodiments of the present disclosure determine which objects within the XML form should bind with the encrypted XML data by analyzing the data element descriptions within the replacement properties. The form may thus bind properly to encrypted data, even when the data is inaccessible in encrypted form.

Various embodiments of a method and apparatus for correctly binding form objects to encrypted XML data are disclosed herein. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated or transformed. It has proven convenient at times, principally for reasons of common usage, to refer to such signals as bits, data, values, elements, symbols, characters, terms, numbers, numerals or the like.

It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "identifying," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. The terms "processes," and "applications" refer to instances of computer programs. One of ordinary skill in the art would recognize that a single application might be made of multiple processes. When an application is executed, the execution path becomes one or more corresponding processes executed by the processor in conjunction with an operating system.

Figure 1:
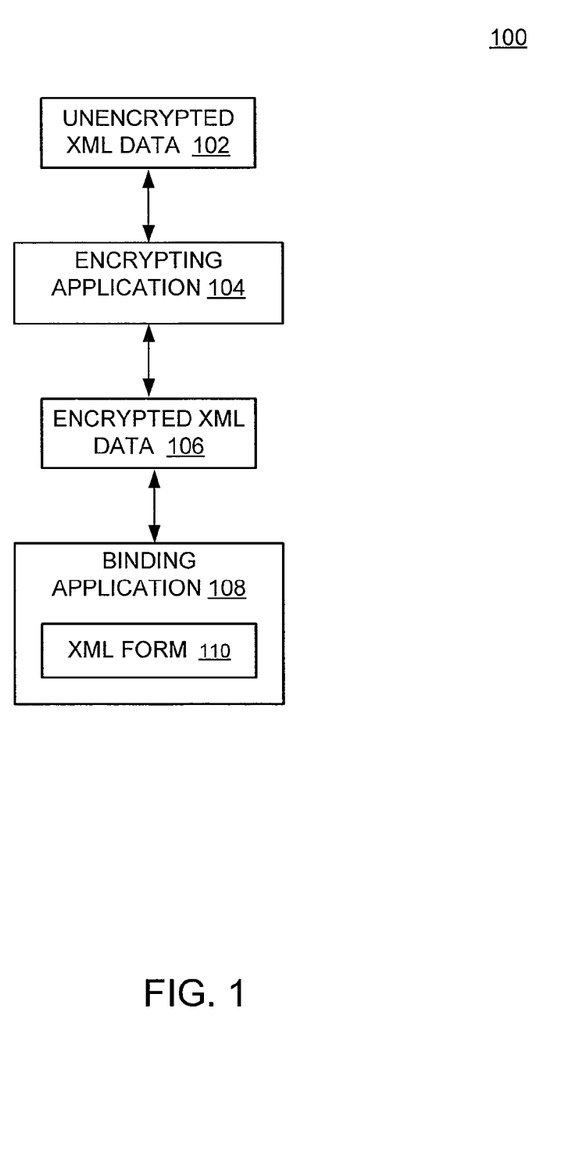
FIG. 1 is a functional block diagram of an apparatus for correctly binding form objects to encrypted XML data elements according to one or more embodiments.

FIG. 1 is a functional block diagram of an apparatus 100 for correctly binding form objects to encrypted XML data elements according to various embodiments. Examples of the apparatus 100 include common computer systems, such as but are not limited to, desktop personal computers, smart phones, tablet computers, laptops, servers, mainframes, and the like. One embodiment of a computer system used to implement the various embodiments of the present disclosure is described in detail with respect to FIG. 5. Elements of the apparatus 100 may be used to perform the methods described with respect to FIGS. 3 and 4 as explained in detail below.

In some embodiments, the apparatus 100 accesses unencrypted XML data 102, which includes unencrypted markup elements and content elements. Using an encrypting application 104, the apparatus 100 executes an encryption process on the unencrypted XML data 102 and produces encrypted XML data 106. The unencrypted XML data 102 may represent pre-existing unencrypted XML data, newly entered XML data, or a decrypted set of unencrypted XML data. The unencrypted XML data 102 does not require a special credential to view, and may be freely bound to form objects as defined in XML form 110. The process by which the encrypting application 104 creates the encrypted XML data 106 is described further with respect to FIG. 3.

The binding application 108 binds form objects to an XML data structure, such as the unencrypted XML data 102 or the encrypted XML data 106. After encrypting the unencrypted XML data 102, the binding application 108 rebinds the form objects to the encrypted XML data 106 according to some embodiments. The binding application 108 may bind the form objects to the XML data structure for a variety of reasons, including to access, read, modify and/or edit data within the XML data. The binding application 108 binds to the XML data by a method described further with respect to FIG. 4.

One of ordinary skill in the art would recognize that binding application 108 could be any type of application capable of binding to a set of XML data, such as the encrypted XML data 106 and the unencrypted XML data 102. Furthermore, one of ordinary skill in the art would recognize that the encrypting application 104 and the binding application 108 might be the same application, or variants thereof. In some embodiments, the encrypted XML data 106 may be created on a first computer, and then communicated to a second computer for re-binding. In some embodiments, the encrypting application 104 and the binding application 108 are capable of binding to form objects and/or performing unobfuscation of encrypted XML data descriptions in accordance with embodiments of the method described with respect to FIG. 4.

The binding application 108 further comprises XML form 110. The XML form 110 indicates bindings between the encrypted XML data 106 and various form objects. The encrypted XML data 106 represents a set of data that has been encrypted after generation. The encrypted XML data 106 comprises a set of replacement properties (i.e., EncryptionProperty), which are populated with information describing the data elements. The structure of the encrypted XML data 106 is described further with respect to FIG. 2. An element of the encrypted XML data 106 may refer to an element of the unencrypted XML data 102.

Figure 2:
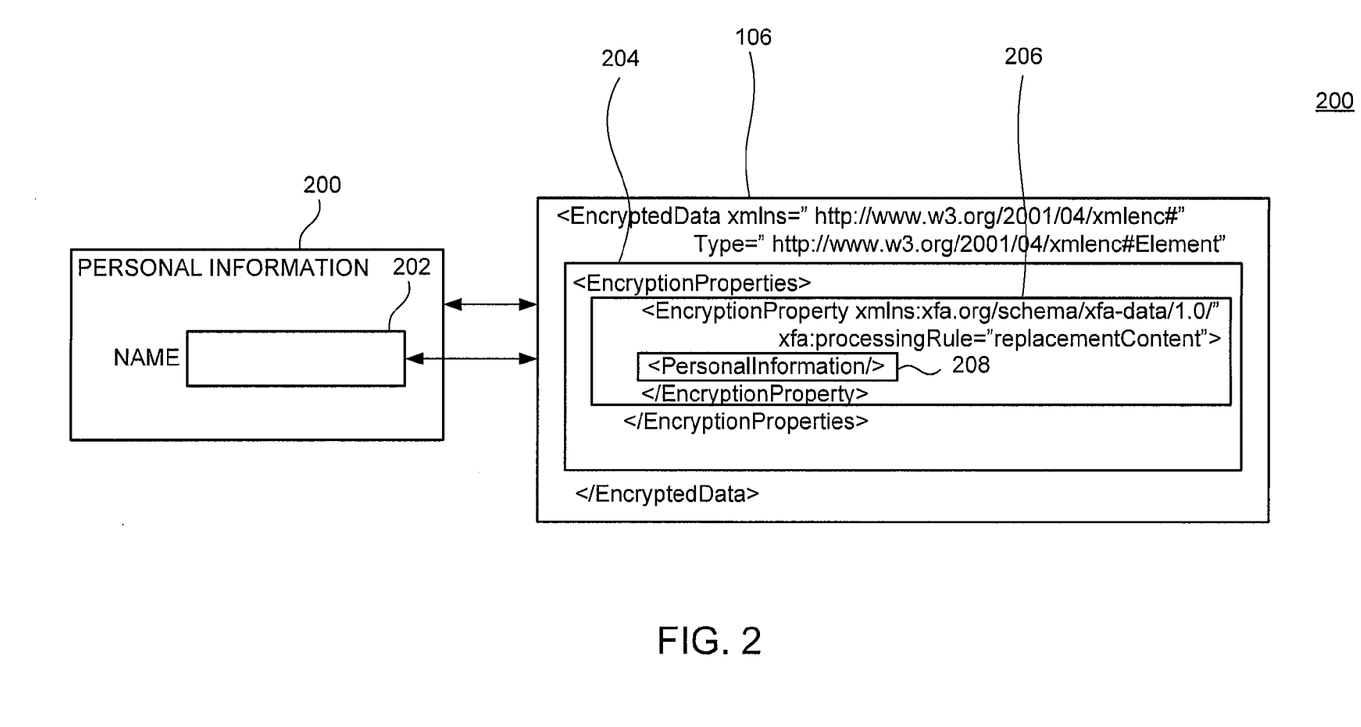
FIG. 2 is a block diagram depicting an XML form having form objects bound to a set of encrypted XML data according to one or more embodiments.

FIG. 2 is a block diagram depicting the XML form 110 having form objects bound to a set of encrypted XML data 106 in accordance with embodiments of the present invention. For the purposes of brevity, elements of the EncryptedData structure have been omitted. The XML form binding operations as depicted in FIG. 2 are implemented using an apparatus, such as the apparatus 100 described with respect to FIG. 1 or the computer system 500 described with respect to FIG. 5. A binding application performs these binding operations, which involve binding form objects to a set of encrypted XML data 106. For example, XML form 110 comprises a form object 202 entitled "Name". Because the "Name" form object 202 is a descendent of a "Personal Information" form object 200, the "Name" form object 202 may be referred to as a sub-form object. The XML form 110 includes an encrypted data element that includes content (i.e., a first and last name) bound to the "Name" form object 202.

When a set of unencrypted XML data is encrypted, the markup elements within the unencrypted XML data are converted to a set of markup elements describing the encryption. The markup elements that identify the encrypted data are specified within the XML standard. The XML standard further identifies a field known as encryption properties 204 (e.g., "EncryptionProperties" attribute). The encryption properties 204 comprise a set of replacement properties that restore original bindings (i.e., prior to encryption). Embodiments of the present disclosure store markup elements from the original unencrypted data within the set of replacement properties at the time the encryption occurs. The method by which the markup elements are stored within the encryption properties 204 is described further with respect to FIG. 3. As illustrated, a replacement property 206 includes a replacement content instruction for substituting a portion of unencrypted XML data with a data description 208 that identifies an appropriate form object for binding. In some embodiments, the replacement property 206 is added to the encryption properties 204 of the encrypted XML data 106.

Figure 3:
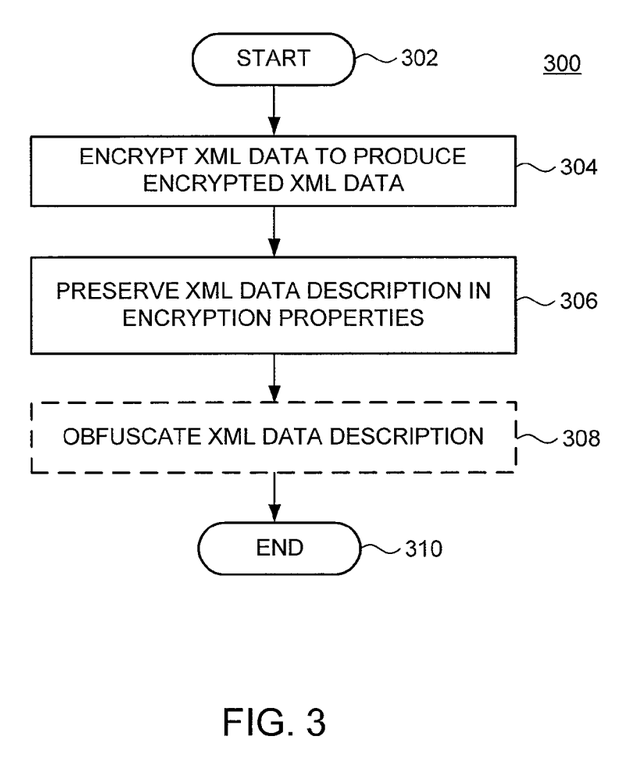
FIG. 3 is a flow diagram depicting a method for encrypting data elements in XML data using a computer system that implements an apparatus, such as the apparatus described with respect to FIG. 1, according to one or more embodiments.

FIG. 3 is a flow diagram of a method 300 for encoding XML data descriptions within replacement properties of XML data. In some embodiments, each and every step of the method 300 may be performed by an encrypting application 104 executed on a computer system, such as the apparatus 100 described with respect to FIG. 1 or a computer system 500 described with respect to FIG. 5. Execution of the method 300 results in a set of encrypted XML data that can bind to form objects of an XML form in the manner described with respect to FIG. 2. The method 300 begins at step 302 and proceeds to step 304. At step 304, the method 300 encrypts a set of XML data to produce encrypted XML data. During the encryption operation, the method 300 extracts the root data description (e.g., cleartext XML) associated with the encrypted content elements. The root data description may be stored in a replacement property (e.g., the replacement property 206 of FIG. 2) of the encrypted data element. After encrypting the data and extracting the data description, the method 300 proceeds to step 306.

At step 306, the method 300 preserves the extracted description within the replacement properties of the encrypted XML data. In some embodiments, storing the data descriptions of the XML data attributes in the encrypted XML data is accomplished by extending the EncryptionProperty element defined by the W3C XML Encryption Standard, which is herein incorporated by reference in its entirety. The method 300 extends the standard by introducing a property that indicates a replacement content instruction—that is, the enclosing EncryptedData XML data is treated as a replacement for unencrypted XML data that would have otherwise been in its place. Within the replacement property, the method 300 describes the unencrypted XML data that the EncryptedData should "replace". The method 300 then optionally proceeds to step 308.

In some embodiments, the data description is sensitive and cannot be stored in an unobfuscated form. At step 308, the method 300 optionally obfuscates the data description that is stored in the replacement properties. The obfuscation of the data description may be performed in a variety of ways. One way to obfuscate the data description is to rename the form object and the unencrypted XML data element to something arbitrary. For example, a random string of alphanumeric characters may be used. After XML encryption is applied at the random string level, the resulting EncryptedData structure will contain the random string, thereby concealing all aspects of the unencrypted content.

Another way to obfuscate the data description is to add an enclosing form object and an enclosing unencrypted XML data element with an arbitrary name. After XML encryption is applied at the arbitrary name level, the resulting EncryptedData structure will contain the arbitrary name, thereby concealing all aspects of the unencrypted content.

Finally, obfuscation of the data description may be accomplished by obfuscating, masking, or encrypting the stored description in such a way that the application can unobfuscate, unmask, or decrypt it, but where the user cannot. For example, the data description may be encrypted by a key stored within the executable binding the form to the encrypted data, a key to which the user does not have access. In another embodiment, the key used to obfuscate the data description may be present within a keystore accessible by the application but unavailable to the user. After XML encryption is applied at the "PersonalInformation" level, the resulting EncryptedData structure will contain an obfuscated, masked, or encrypted version of the string. These techniques solve the issue of leaking data description information in the EncryptedData structure. These techniques solve the issue of not being able to match the form object to the XML data with the same description.

After optionally obfuscating the XML data description, the method 300 ends at step 310 with a set of encrypted XML data, with data descriptions stored in the replacement properties.

Figure 4:
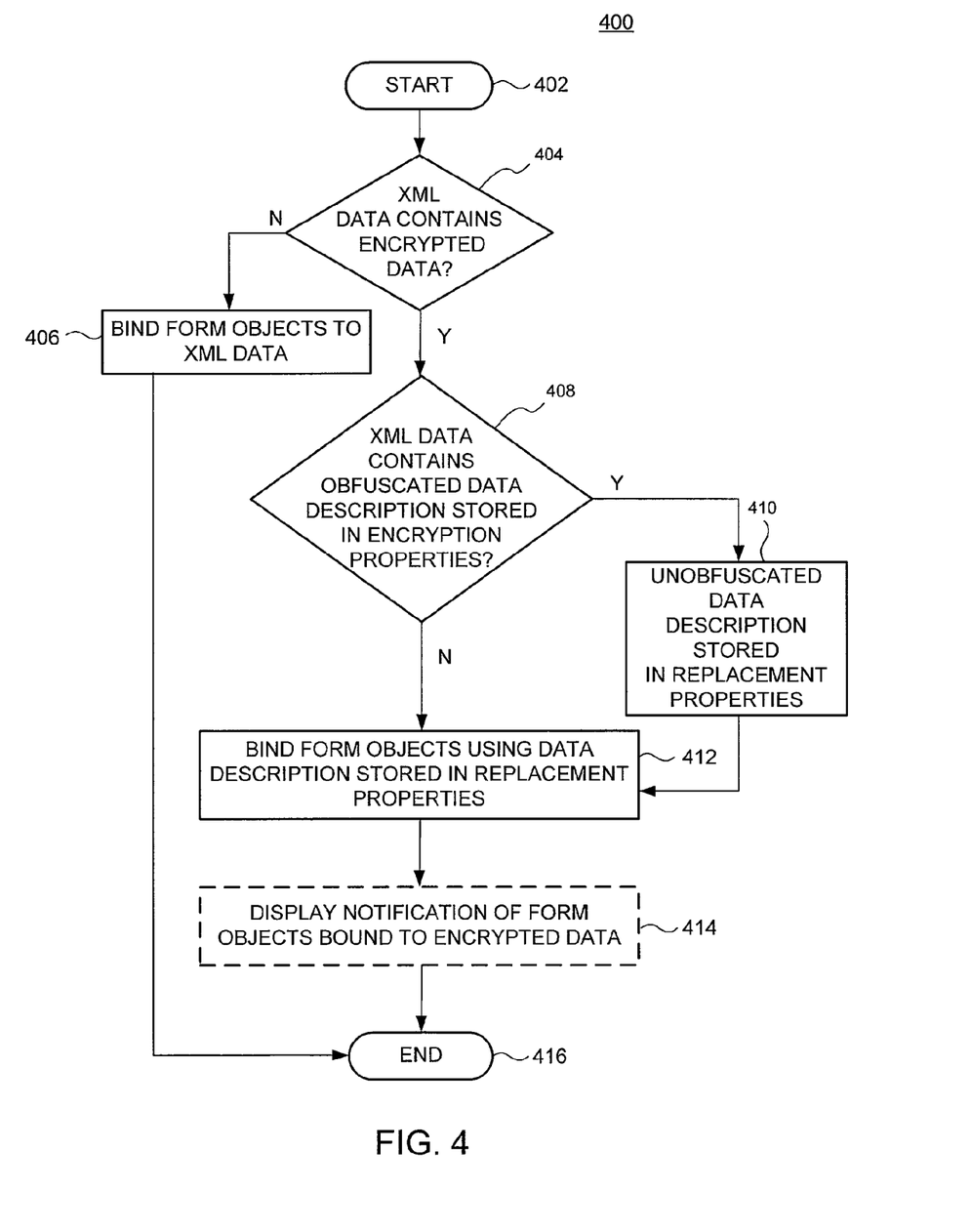
FIG. 4 is a flow diagram depicting a method for correctly binding an encrypted data element to XML form objects using a computer system that implements an apparatus, such as the apparatus described with respect to FIG. 1, according to one or more embodiments.

FIG. 4 is a flow diagram depicting a method 400 for binding a form object to a set of encrypted XML data. In some embodiments, each and every step of the method 400 may be performed by the binding application 108 executing on a computer system such as the apparatus 100 described with respect to FIG. 1 or the computer system 500 described with respect to FIG. 5. Execution of the method 400 results in a set of encrypted XML data bound to an XML form in the manner described with respect to FIG. 2. The method 400 begins at step 402 when a set of encrypted XML data (e.g. the set of encrypted data generated by the method 300 described with respect to FIG. 3), is to be bound to an XML form (e.g. the XML form 110 described with respect to FIG. 1 and FIG. 2). The method 400 then proceeds to step 404.

At step 404, the method determines whether the XML data contains encrypted data. This step may be performed by searching for the EncryptedData markup tags specified by the W3C XML Encryption Standard. If the XML data contains encrypted data, the method 400 proceeds to step 408. If the XML data does not contain encrypted data, the method 400 proceeds to step 406.

At step 406, the method 400 binds the unencrypted XML data to the XML form objects in accordance with standard XML form binding rules. After the unencrypted XML data is bound to the XML form objects, the method 400 ends at step 416. If the method 400 determines that the XML data contains encrypted data, the method proceeds to step 408. At step 408, the method 400 determines whether the XML data contains an obfuscated data description, as described above with respect to optional step 308 of FIG. 3. If the data description is obfuscated, the method 400 proceeds to step 410. If the data description is not obfuscated, the method proceeds to step 412.

At step 410, the method 400 determines if the obfuscated data description should be bound to form objects, by applying the inverse of the methods described with respect to step 308 of FIG. 3. The XML form and/or application will have a predetermined obfuscation strategy. For example, the application or form may add an arbitrary enclosing element to form object and data prior to encryption. The binding operation binds the form object with arbitrary name to the EncryptedData with data description matching the arbitrary name.

In some embodiments, the application or form may have instructions to obtain a key from a keystore and use that key to obfuscate the data description (e.g., as performed by the method 300 at step 308). During the binding operation, the method 400 obtains the same key from a keystore and uses that key to unobfuscate the data description during step 410. The unobfuscated data description is then used for binding at step 412. In some embodiments, the obfuscation/unobfuscation operation performed in this manner may be an encryption/description operation using the key from the keystore. After unobfuscating the data description, the method 400 proceeds to step 412.

At step 412, after determining the XML data contains an unobfuscated data description located within the replacement properties of the XML data, the method 400 binds the form objects to the appropriate encrypted data by using the unobfuscated data description to identify the proper bindings for each form object. In order to ensure that that form objects bind to the proper data elements, the method 400 also introduces a new binding rule: If a form object would have been bound to a descendent of the unencrypted version of an EncryptedData, that form object will bind to that EncryptedData. Once a form object binds to an encrypted data, there is no chance that the form object will attempt to bind to something else to which it was not intended. This prevents a form object that was intended to bind to encrypted data from binding to unencrypted data in a separate data structure. After binding the form objects to the encrypted data, the method 400 optionally proceeds to step 414.

At optional step 414, the method 400 may display a notification of form objects that are bound to encrypted data. By introducing an improved method and apparatus for binding form objects to XML data, form logic is now capable of detecting when form objects are bound to encrypted XML data. The form logic can now take appropriate action when a form object is bound to EncryptedData.

For example, the form logic may annotate form objects bound to encrypted XML data by making the form objects read-only and/or populating the form objects with stars (****) or something else appropriate for the particular type of form object. In some embodiments, encrypted form objects may be denoted by a "padlock" symbol superimposed over the object. The choice of how to depict form objects bound to encrypted XML data is entirely up to the form author.

The ability to detect form objects bound to encrypted data allows for many useful applications. Consider the example of a medical insurance claim form. The Claimant fills in 3 sections of the form. The 1st section is for personal information such as Name and Address and ID number. The 2nd section is for the items the Claimant is claiming. The 3rd section is for the Claimant's signature and the date.

Once the form is filled and saved, the form encrypts the XML data from Section 2 for a "Claims" credential and the XML data from Sections 1 and 3 for an "Administration" credential. The form is then routed to the Claims department for approval. When the form is opened by the Claims department, the Claims credential can decrypt only the XML data associated with Section 2 of the form. There is no need for the Claims department to be aware of the Claimant's address or signature, only the contents of the claim. As such, the form shows that Sections 1 and 3 of the form are "locked" by displaying an image of a padlock over top of unfilled and blurred form content. Based on the details of the Claims and the plan number (in clear view), the Claims department determines an amount of payment to issue to the Claimant and enters that into the form (in clear view).

The form is routed to the Administration department for payment. When the form is opened by the Administration department, the Administration credential can decrypt only the XML data associated with Sections 1 and 3 of the form. There is no need for the administrators to know the specific contents of the claim, only whether the Claims department has approved or denied the claim, and the identity/address of the Claimant. Thus, the form shows that Section 2 of the form is "locked" by displaying an image of a padlock over top of unfilled and blurred form content. The Administration department ensures the Claimant belongs to the cited plan number and then uses the Claimant's name and address and amount of payment (in clear view) to issue and send a cheque.

If an unauthorized party (one that is not "Claims" or "Administration") opens the form, all XML data remains encrypted. The form shows that all sections of the form are "locked" by displaying an image of a padlock over top of unfilled and blurred form content. At no point in the workflow can any party other than the Claimant correlate the Claimant's personal information with the items being claimed. Thus embodiments of the invention advantageously provide for the use of a single form with multiple elements of encrypted XML data.

Example Computer System

Various embodiments of a system and method for binding form objects to encrypted XML data as described herein may be executed on one or more computer systems, which may interact with various other devices. One such computer system is a computer system 500 illustrated by FIG. 5, which may in various embodiments implement any of the elements of functionality illustrated in FIGS. 1-4. In various embodiments, computer system 500 may be configured to bind form objects to encrypted XML data, as described above. While the illustrated system demonstrates the computer system 500 binding form objects to encrypted XML data, the computer system 500 may be used to implement any other system, device, element, functionality or method of the above-described embodiments. In the illustrated embodiments, the computer system 500 may be configured to bind form objects to encrypted XML data as processor-executable program instructions 522 (e.g., program instructions executable by processor(s) 510a-510n) in various embodiments.

Figure 5:
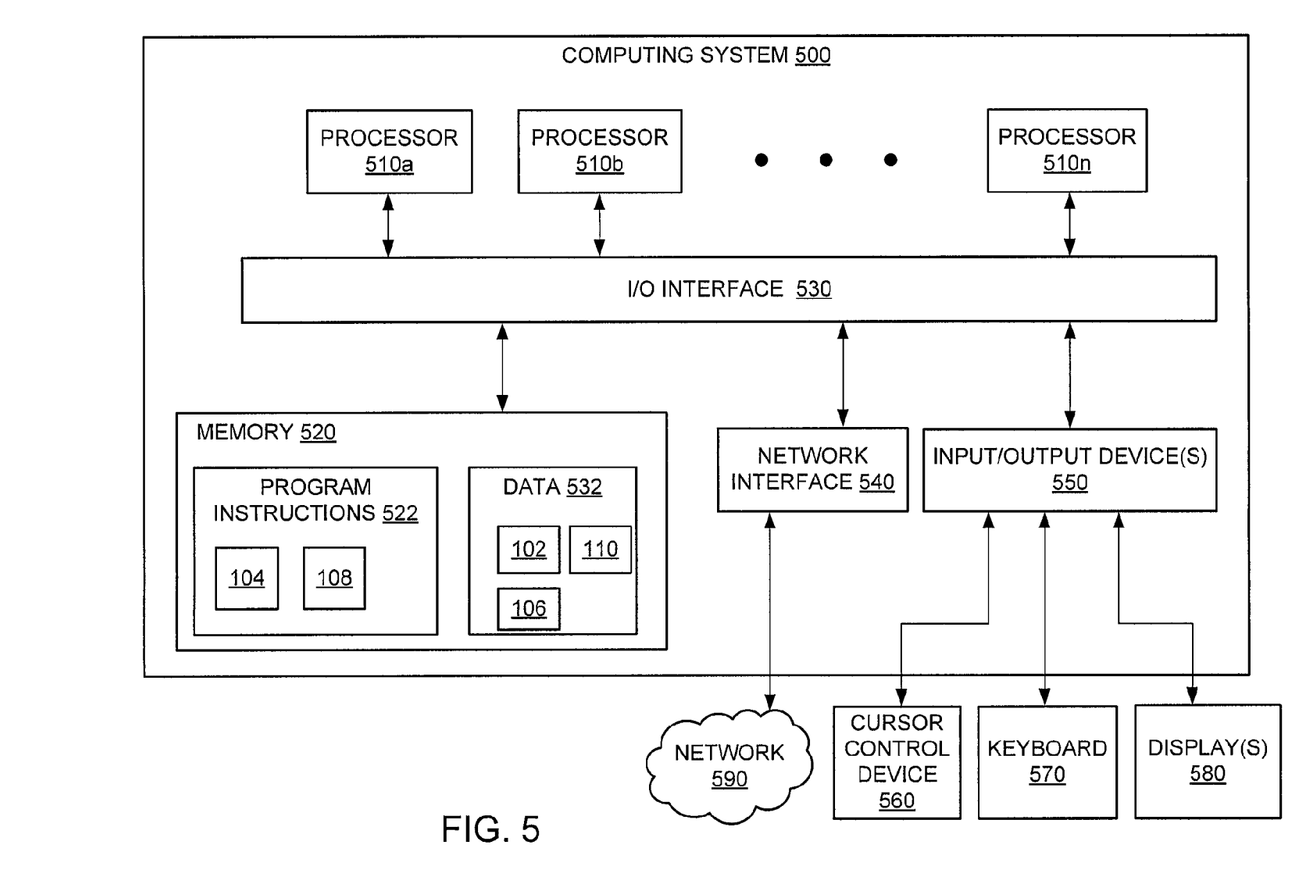
FIG. 5 is a detailed block diagram of an exemplary computer system that implements an apparatus, such as the apparatus described with respect to FIG. 1, and executes various methods, such as the methods described with respect to FIGS. 3-4, according to one or more embodiments.

In the illustrated embodiment, the computer system 500 includes one or more processors 510a-510n coupled to a system memory 520 via an input/output (I/O) interface 530. The computer system 500 further includes a network interface 540 coupled to I/O interface 530, and one or more input/output devices 550, such as cursor control device 560, keyboard 570, and display(s) 580. In various embodiments, any of the components 560-580 may be utilized by application software such as for example, the encrypting application 104 or the binding application 108 of FIG. 1, for receiving input. In various embodiments, a user interface may be generated and displayed on the display 580. In some cases, it is contemplated that embodiments may be implemented using a single instance of the computer system 500, while in other embodiments multiple such systems, or multiple nodes making up the computer system 500, may be configured to host different portions or instances of various embodiments. For example, in one embodiment some elements may be implemented via one or more nodes of the computer system 500 that are distinct from those nodes implementing other elements. In another example, multiple nodes may implement the computer system 500 in a distributed manner.

In different embodiments, the computer system 500 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, application server, or in general any type of computing or electronic device that is capable of having software installed.

In various embodiments, the computer system 500 may be a uniprocessor system including one processor 510a, or a multiprocessor system including several processors 510a-510n (e.g., two, four, eight, or another suitable number). Examples of common computer systems such as the computer system 500, include, but are not limited to, desktop PCs, smart phones, tablet computers, laptops, servers, mainframes, and the like. The processors 510a-510n may be any suitable processor capable of executing instructions. For example, in various embodiments the processors 510a-510n may be general-purpose or embedded processors implementing any of a variety of instruction set architectures (ISAs), such as the x86, PowerPC, SPARC, or MIPS ISAs, or any other suitable ISA. In multiprocessor systems, each of the processors 510a-510n may commonly, but not necessarily, implement the same ISA.

System memory 520 may be configured to store program instructions 522 and/or data 532 accessible by the processors 510a-510n. In various embodiments, the system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within the system memory 520. In other embodiments, program instructions and/or data may be received, sent or stored upon different types of computer-accessible media or on similar media separate from the system memory 520 or the computer system 500. In some embodiments, system memory 520 includes software packages, such as the encrypting application 104 and the binding application 108, as well as various data, such as the unencrypted data 102, the encrypted data 106 and the XML form 110.

In one embodiment, the I/O interface 530 may be configured to coordinate I/O traffic between the processors 510a-510n, system memory 520, and any peripheral devices in the device, including the network interface 540 or other peripheral interfaces, such as the input/output devices 550, In some embodiments, the I/O interface 530 may perform any necessary protocol, timing or other data transformations to convert data signals from one component (e.g., system memory 520) into a format suitable for use by another component (e.g., processors 510a-510n). In some embodiments, the I/O interface 530 may include support for devices attached through various types of peripheral buses, such as a variant of the Peripheral Component Interconnect (PCI) bus standard or the Universal Serial Bus (USB) standard, for example. In some embodiments, the function of the I/O interface 530 may be split into two or more separate components, such as a north bridge and a south bridge, for example. Also, in some embodiments some or all of the functionality of the I/O interface 530, such as an interface to the system memory 520, may be incorporated directly into the processors 510a-510n.

The network interface 540 may be configured to allow data to be exchanged between the computer system 500 and other devices attached to a network (e.g., network 590), such as one or more external systems or between nodes of the computer system 500. In various embodiments, the network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The Input/output devices 550 may, in some embodiments, include one or more display terminals, keyboards, keypads, touchpads, scanning devices, voice or optical recognition devices, or any other devices suitable for entering or accessing data by one or more computer systems. Multiple input/output devices may be present in the computer system 500 or may be distributed on various nodes of the computer system 500. In some embodiments, similar input/output devices may be separate from the computer system 500 and may interact with one or more nodes of the computer system 500 through a wired or wireless connection, such as over the network interface 540.

In some embodiments, the illustrated computer system 500 may execute software code for performing various operations, such as the encrypting application 104 for encrypting XML data elements as well as the binding application 108 for correctly binding form objects to the encrypted data elements. In some embodiments, the illustrated computer system 500 may implement any of the methods described above, such as the methods illustrated by the flow diagrams of FIGS. 3 and 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The foregoing embodiments comprise a number of elements and/or modules that perform various functions as described. The elements and/or modules are exemplary implementations of means for performing their respective functions.

While the foregoing is directed to embodiments of the present invention, other and further embodiments of the invention may be devised without departing from the basic scope thereof, and the scope thereof is determined by the claims that follow.

The invention claimed is:

1. A computer implemented method for correctly binding form objects to encrypted XML data, comprising:
   encrypting, by at least one processor, a set of unencrypted XML data to generate a set of encrypted XML data with markup elements that are inaccessible;
   during the encrypting, extracting unencrypted data descriptions;
   obfuscating the extracted unencrypted data descriptions by renaming the data descriptions with random strings;
   storing the obfuscated data descriptions in a set of replacement properties;
   examining, by the at least one processor, at least one data description stored in the set of replacement properties associated with an encrypted data element from the set of the encrypted XML data that has markup elements that are inaccessible to identify a form object to bind to the encrypted data element; and
   binding the form object identified from the at least one data description to the encrypted data element of the set of encrypted XML data wherein the binding comprises binding the form object to the encrypted data element of the set of the encrypted XML data when the form object would have bound to a descendent of an unencrypted version of the encrypted data element of the set of the encrypted XML data.

2. The computer implemented method of claim 1, wherein binding the form object further comprises binding the form object to the encrypted data element based on the encrypted data element and the form object having corresponding data descriptions.

3. The computer implemented method of claim 1, wherein the set of replacement properties are placed within the set of the encrypted XML data.

4. The computer implemented method of claim 1, further comprising obfuscating form objects by renaming the form objects with the random strings.

5. The computer implemented method of claim 1, wherein binding further comprises: unobfuscating the at least one data description.

6. The computer implemented method of claim 1, further comprising: taking an action based on the form object being bound to the encrypted data element.

7. The computer implemented method of claim 6, wherein the action comprises at least one of setting the form object to be read-only or displaying an indicator that the form object is bound to the encrypted data element.

8. The computer implemented method of claim 1, further comprising: extracting the at least one data description of the set of unencrypted XML data before the encrypting the set unencrypted XML data.

9. The computer implemented method of claim 4, wherein the random strings comprise arbitrary names.

10. A non-transitory computer readable storage medium for storing software that, when executed by a computing system, causes the computing system to perform steps comprising:
   encrypting, by at least one processor, a set of unencrypted XML data to generate a set of encrypted XML data with markup elements that are inaccessible;
   during the encrypting, extracting unencrypted data descriptions;
   obfuscating the extracted unencrypted data descriptions by renaming the data descriptions with random strings;
   storing the obfuscated data descriptions in a set of replacement properties;
   examining at least one data description stored in the set of replacement properties, wherein each data description is associated with an encrypted data element from the set of the encrypted XML data; and
   binding a form object identified from the at least one data description to the encrypted data element of the set of the encrypted XML data, wherein the binding comprises binding the form object to the encrypted data element of the set of the encrypted XML data when the form object would have bound to a descendent of an unencrypted version of the encrypted data element of the set of the encrypted XML data.

11. The non-transitory computer readable storage medium of claim 10, wherein binding further comprises: binding the form object to the encrypted data element based on the encrypted data element and the form object having corresponding data descriptions.

12. The non-transitory computer readable storage medium of claim 10, wherein extracting further comprises: unobfuscating the at least one data description.

13. The non-transitory computer readable storage medium of claim 10, further comprising instructions that when executed by the computing system cause the computing system to perform as part of the method: taking an action based on the form object being bound to the encrypted XML data element.

14. The non-transitory computer readable storage medium of claim 13, wherein the action is at least one of setting the form object to read-only or displaying an indicator that the form object is bound to the encrypted data element.

15. An apparatus for correctly binding form objects to encrypted XML data comprising:
   at least one processor,
   a non-transitory storage medium comprising instructions that, when executed by the at least one processor, cause the apparatus to:
   encrypt a set of unencrypted XML data to generate a set of encrypted XML data with markup elements that are inaccessible;
   during the encrypting, extract unencrypted data descriptions;
   obfuscate the extracted unencrypted data descriptions by renaming the data descriptions with random strings;
   store the obfuscated data descriptions in a set of replacement properties;
   examine at least one data description stored in the set of replacement properties associated with an encrypted data element from the set of the encrypted XML data that has markup elements that are inaccessible to identify a form object to bind to the encrypted data element; and
   bind the form object identified from the at least one data description to the encrypted data element of the set of encrypted XML data wherein the binding comprises binding the form object to the encrypted data element of the set of the encrypted XML data when the form object would have bound to a descendent of an unencrypted version of the encrypted data element of the set of the encrypted XML data.

16. The apparatus of claim 15, wherein the instructions, when executed by the at least one processor, cause the apparatus to bind the form object to the encrypted data element based on the encrypted data element and the form object having corresponding data descriptions.

17. The apparatus of claim 15, wherein the instructions, when executed by the at least one processor, cause the apparatus to obfuscate form objects by renaming the form objects with the random strings.

* * * * *